US011167562B2

(12) United States Patent
Hirano

(10) Patent No.: US 11,167,562 B2
(45) Date of Patent: Nov. 9, 2021

(54) LIQUID DISCHARGING DEVICE, LIQUID DISCHARGING METHOD, AND COMPUTER PROGRAM PRODUCT

(71) Applicant: Masanori Hirano, Kanagawa (JP)

(72) Inventor: Masanori Hirano, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 28 days.

(21) Appl. No.: 16/789,558

(22) Filed: Feb. 13, 2020

(65) Prior Publication Data
US 2020/0269598 A1    Aug. 27, 2020

(30) Foreign Application Priority Data

Feb. 27, 2019 (JP) .............................. JP2019-034392

(51) Int. Cl.
*B41J 2/21* (2006.01)
*B41J 2/14* (2006.01)
*G06K 15/10* (2006.01)
*B41J 2/15* (2006.01)

(52) U.S. Cl.
CPC ............... *B41J 2/2103* (2013.01); *B41J 2/14* (2013.01); *B41J 2/15* (2013.01); *G06K 15/102* (2013.01); *G06K 15/107* (2013.01)

(58) Field of Classification Search
CPC ........ G06K 15/105; G06K 15/107; B41J 2/15
See application file for complete search history.

(56) References Cited

U.S. PATENT DOCUMENTS

| 7,499,198 B2 | 3/2009 | Hirano |
| 7,600,842 B2 | 10/2009 | Hirano et al. |
| 7,982,915 B2 | 7/2011 | Nakano et al. |
| 10,083,380 B2 | 9/2018 | Hirano et al. |
| 2007/0091135 A1 | 4/2007 | Hosaka et al. |
| 2008/0143767 A1 | 6/2008 | Ochiai et al. |
| 2009/0219340 A1 | 9/2009 | Ochiai et al. |
| 2011/0043561 A1 | 2/2011 | Fuse et al. |
| 2012/0120135 A1 | 5/2012 | Suzuki et al. |

(Continued)

FOREIGN PATENT DOCUMENTS

| JP | 05167838 A | * | 7/1993 | ........... G06K 15/107 |
| JP | 2011-042081 | | 3/2011 | |

(Continued)

*Primary Examiner* — Julian D Huffman
(74) *Attorney, Agent, or Firm* — Harness, Dickey & Pierce, P.L.C.

(57) ABSTRACT

A liquid discharging device discharges a liquid onto a recording medium for image formation, and includes head modules each including a nozzle array that discharges a liquid of at least one color, the head modules being connected in a direction of the nozzle array from one of the head modules, the one supported by a guide extending in a main-scanning direction; and processing circuitry functioning as an acquirer that acquires image data based on which the image is formed, and an allocator that allocates, to dots of the image data, a row of liquid droplets discharged from one of the head modules closest to the guide in a sub-scanning direction, such that the liquid droplets discharged from the head module closest to the guide are equal to or higher in ratio than the liquid droplets discharged from each head module other than the head module closest to the guide.

9 Claims, 14 Drawing Sheets

YAWING

PITCHING

(56) References Cited

U.S. PATENT DOCUMENTS

2015/0306891 A1  10/2015  Sohgawa et al.
2019/0283412 A1   9/2019  Nonoyama et al.

FOREIGN PATENT DOCUMENTS

| JP | 5063323 | | 8/2012 | | |
|----|---------|---|--------|---|---|
| JP | 5716360 | | 3/2015 | | |
| JP | 2016159530 | A * | 9/2016 | ............ | B41J 19/142 |
| JP | 2016-203494 | | 12/2016 | | |

* cited by examiner

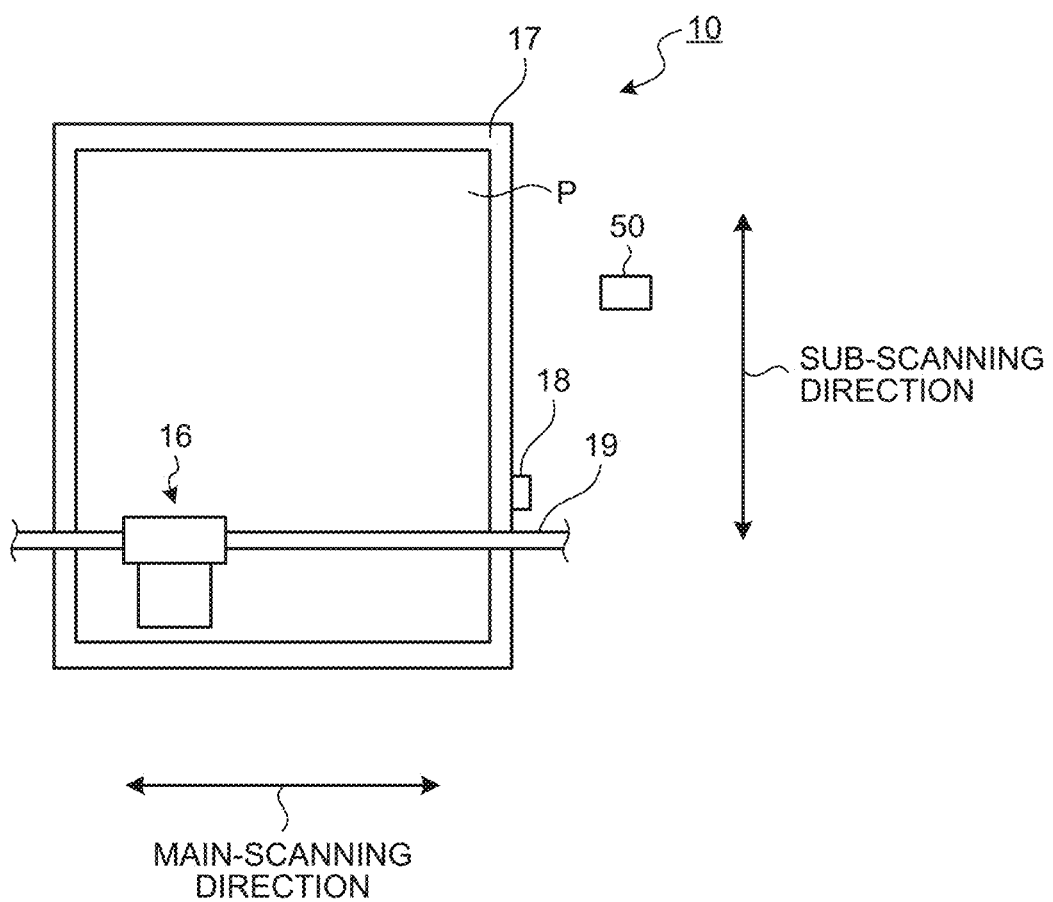

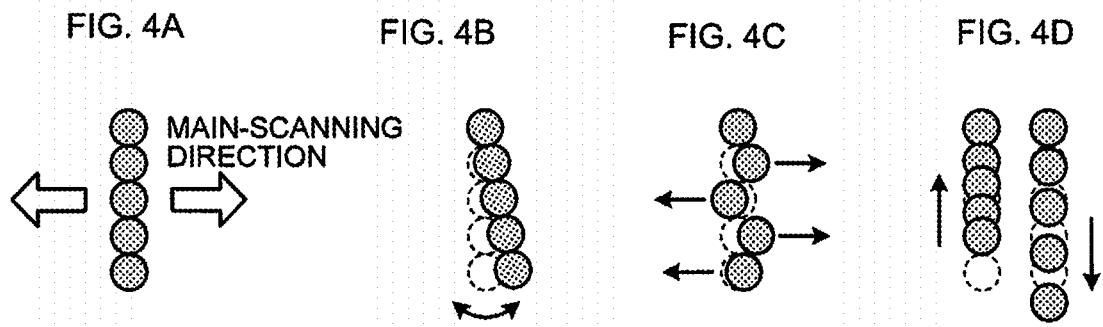
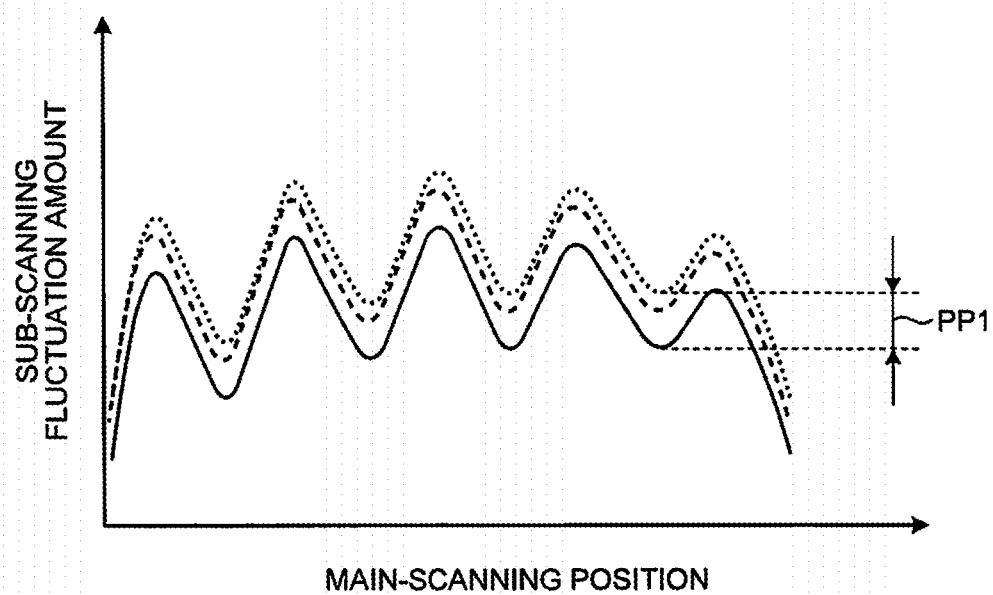

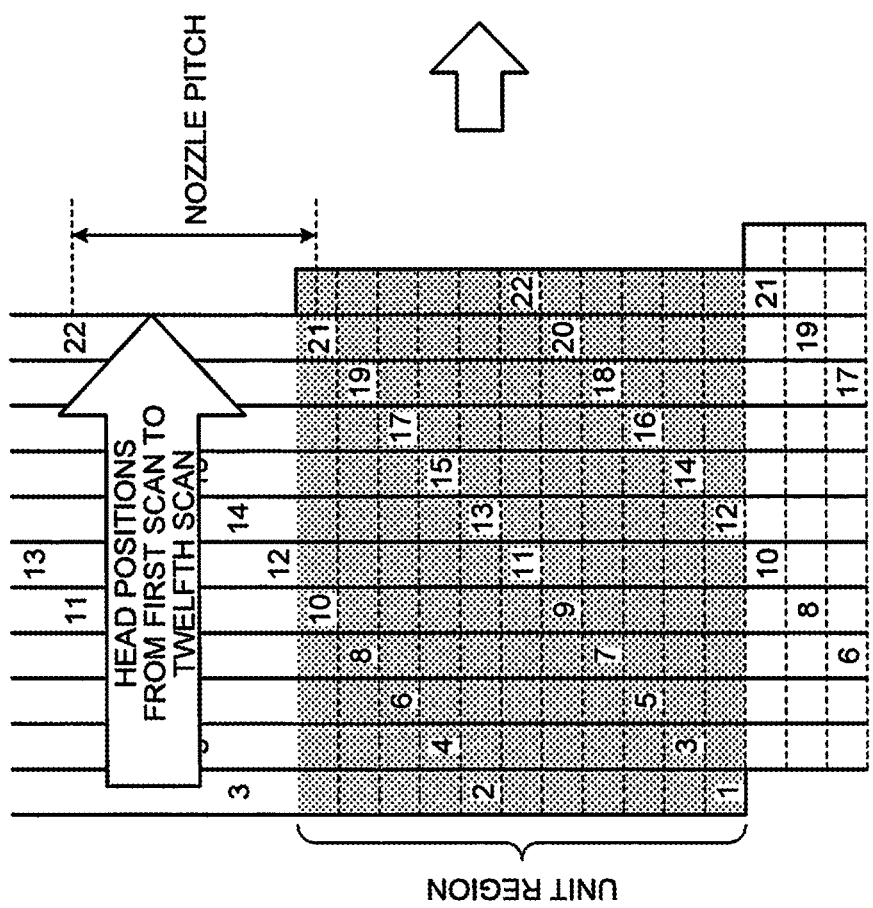

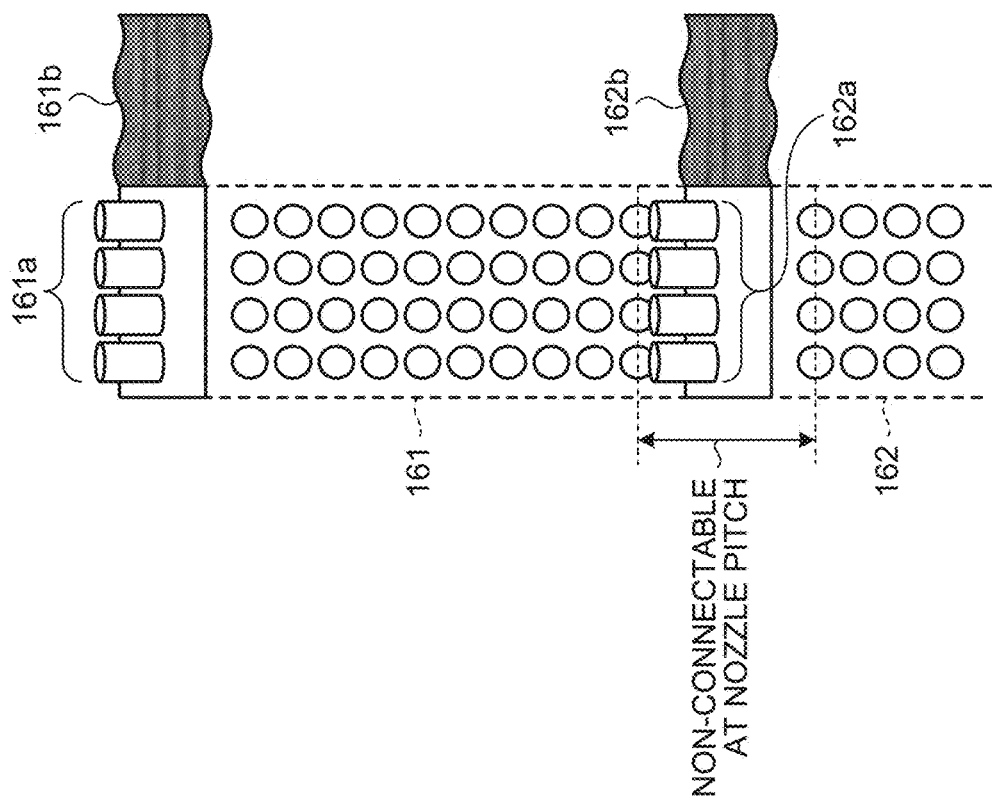
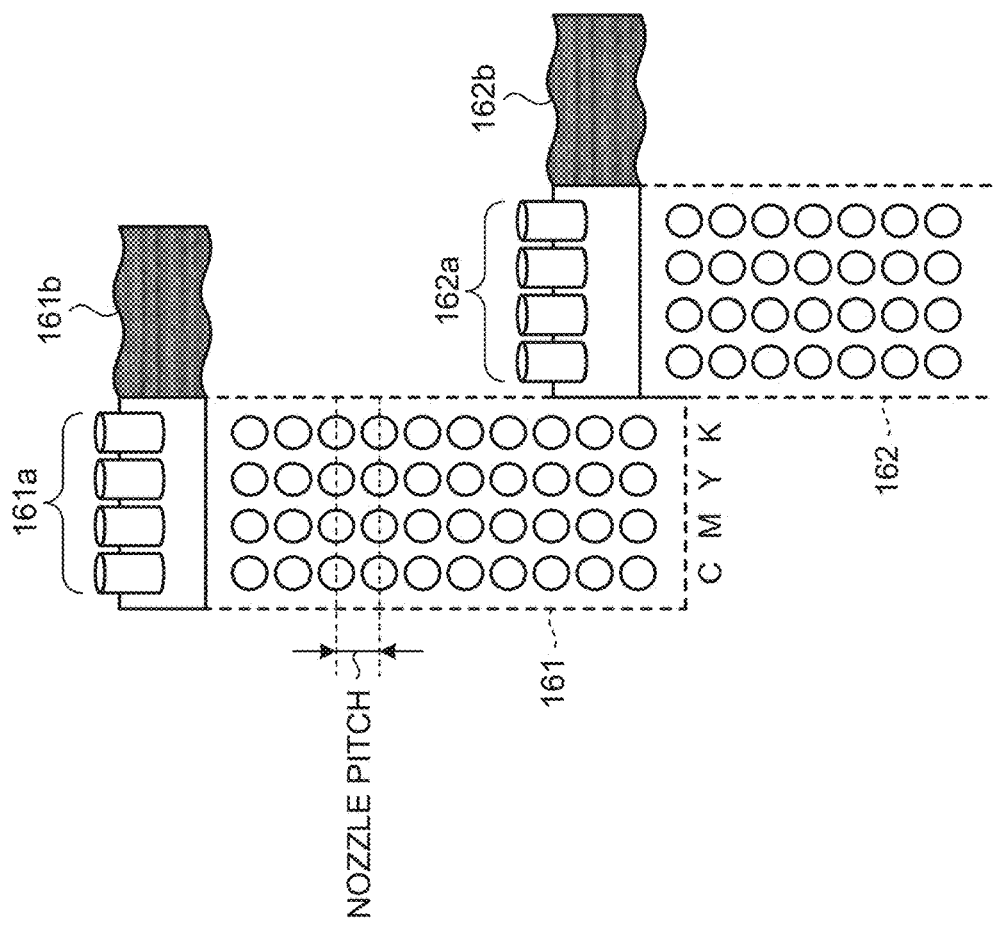

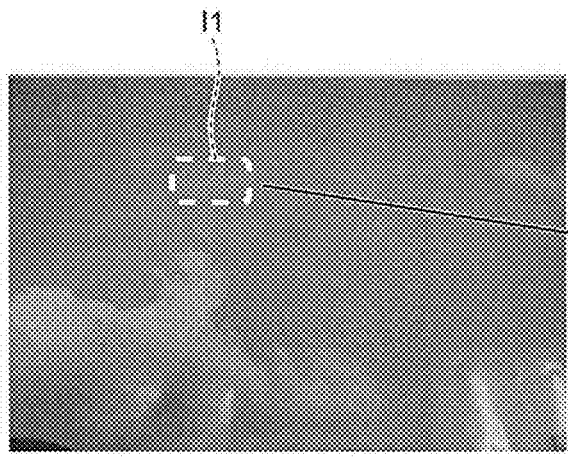
FIG. 9A
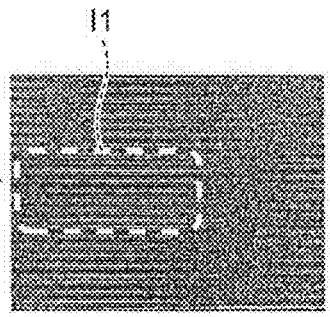
FIG. 9B
FIG.10A
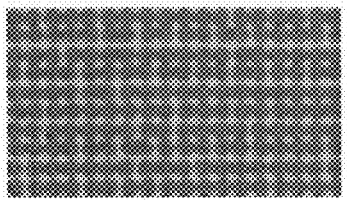
FIG.10B
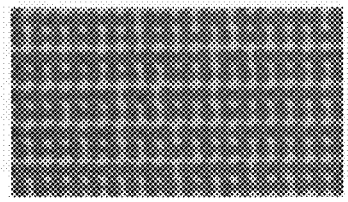
FIG.10C
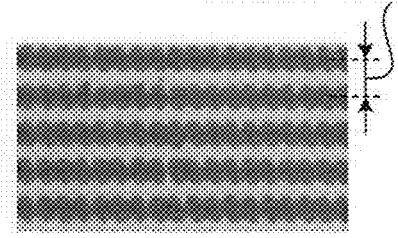
CORRESPONDING TO NOZZLE PITCH

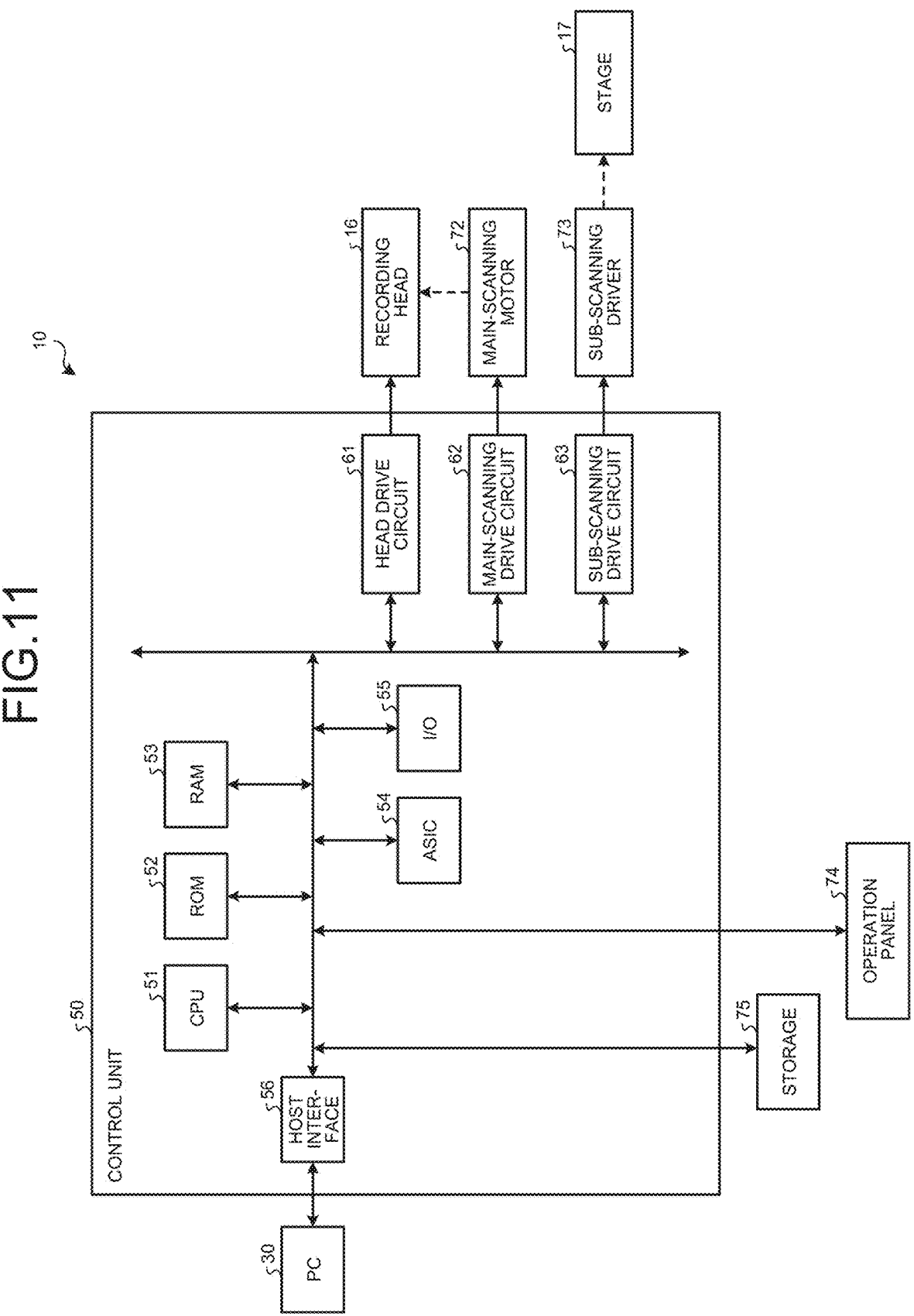

FIG.18

| C1 PRIORITY ROW | M1 PRIORITY ROW | Y1 PRIORITY ROW | K1 PRIORITY ROW |
|---|---|---|---|
| C1 PRIORITY ROW | M1 PRIORITY ROW | Y1 PRIORITY ROW | K1 PRIORITY ROW |
| C1 PRIORITY ROW | M1 PRIORITY ROW | Y1 PRIORITY ROW | K1 PRIORITY ROW |
| C1 PRIORITY ROW | M1 PRIORITY ROW | Y1 PRIORITY ROW | K1 PRIORITY ROW |
| C1 PRIORITY ROW | M1 PRIORITY ROW | Y1 PRIORITY ROW | K1 PRIORITY ROW |
| C1 PRIORITY ROW | M1 PRIORITY ROW | Y1 PRIORITY ROW | K1 PRIORITY ROW |

FIG.19

| C1 PRIORITY ROW | M1 PRIORITY ROW | K1 PRIORITY ROW |
|---|---|---|
| C1 PRIORITY ROW | M1 PRIORITY ROW | K1 PRIORITY ROW |
| C1 PRIORITY ROW | M1 PRIORITY ROW | K1 PRIORITY ROW |
| C1 PRIORITY ROW | M1 PRIORITY ROW | K1 PRIORITY ROW |
| C1 PRIORITY ROW | M1 PRIORITY ROW | K1 PRIORITY ROW |
| C1 PRIORITY ROW | M1 PRIORITY ROW | K1 PRIORITY ROW |

+

| Y3 | Y2 | Y1 |
|---|---|---|
| Y2 | Y1 | Y3 |
| Y1 | Y3 | Y2 |
| Y3 | Y2 | Y1 |
| Y2 | Y1 | Y3 |
| Y1 | Y3 | Y2 | ized
LIQUID DISCHARGING DEVICE, LIQUID DISCHARGING METHOD, AND COMPUTER PROGRAM PRODUCT

CROSS-REFERENCE TO RELATED APPLICATIONS

The present application claims priority under 35 U.S.C. § 119 to Japanese Patent Application No. 2019-034392, filed on Feb. 27, 2019. The contents of which are incorporated herein by reference in their entirety.

BACKGROUND OF THE INVENTION

1. Field of the Invention

The present invention relates to a liquid discharging device, a liquid discharging method, and a computer program product.

2. Description of the Related Art

Conventionally, a serial-scanning ink jet recording device includes nozzle arrays or head units of different colors arranged in a direction perpendicular to the arrays or the units to perform recording or printing by scanning (main scanning) in such a direction (main-scanning direction) while conveying (sub-scanning) a recording medium in a direction (sub-scanning direction) perpendicular to the main-scanning direction. In recent years, head units have been grown in size for the sake of productivity improvement. One example is a connected longer-length head including a plurality of head modules coupled in the direction of a nozzle array.

A serial-scanning ink jet recording device differs from a line-head ink jet recording device including substantially stationary head units even if both devices include the same connected longer-length heads. The serial-scanning ink jet recording device performs recording while the head units moves on a recording medium, which may affect recording quality due to various mechanical factors. A degree of such influence is likely to increase as the head units increase in length. In comparison with an integrated longer-length head, a connected longer-length head includes a plurality of head modules and the head modules differ in recording characteristics depending on how to control the individual head modules and arrangement of the head modules. Such a difference will be an additional variable factor and have a significant influence on recording quality. This may be not a significant matter to a serial-scanning ink jet recording device including a conventional integrated shorter-length head, however, it may be an important issue to address to a serial-scanning ink jet recording device including a connected longer-length head.

Measures against such an issue will be improving device-body stiffness, installing head units having less variation, or machining parts and components at higher accuracy, all of which will result in largely raising costs. Thus, serial-scanning ink jet recording devices including connected longer-length heads cannot be provided at a desirable, relatively low price.

In view of resolving a difference in recording characteristics among the connected head modules of an ink jet recording device, a line-head ink jet recording device is proposed, which includes connected head modules differing in discharge ratio to make image unevenness, occurring due to a phase difference among the head modules by paper meandering, less conspicuous (for example, described in Japanese Patent No. 5063323).

SUMMARY OF THE INVENTION

According to one aspect of the present invention, a liquid discharging device discharges a liquid onto a recording medium for image formation. The device includes a plurality of head modules each comprising an array of nozzles that discharge a liquid of at least one color, the head modules being connected in a direction of the nozzle array from one of the head modules, the one supported by a guide extending in a main-scanning direction; and processing circuitry that functions as an acquirer configured to acquire image data based on which the image is formed; and an allocator configured to allocate, to dots of the image data, a row of liquid droplets discharged from one of the head modules closest to the guide in a sub-scanning direction, such that the liquid droplets discharged from the head module closest to the guide are equal to or higher in ratio than the liquid droplets discharged from each of the head modules other than the head module closest to the guide.

BRIEF DESCRIPTION OF THE DRAWINGS

FIG. 1 is a diagram illustrating an exemplary general configuration of an ink jet recording device according to an embodiment;

FIGS. 4A to 4D illustrate diagrams of influences of the mechanical variable factors on dot-landing positions;

FIG. 5 is a graph depicting fluctuation in landing positions in a sub-scanning direction due to variation in a conveying amount of a recording medium at the time of triple scanning by an integrated head;

FIGS. 6A to 6C illustrate diagrams of a multi-pass recording control;

FIGS. 7A and 7B are diagrams each depicting a positional relationship between head modules of a connected longer-length head;

FIGS. 9A and 9B illustrate diagrams depicting the influence of a phase shift on an actual image by way of example;

FIG. 10A to 10C are enlarged diagrams depicting influences of phase shifts on actual images;

FIG. 11 is a diagram illustrating an exemplary hardware configuration of an ink jet recording device according to an embodiment;

FIG. 18 is a diagram illustrating a multi-pass recording control by an ink jet recording device according to a fourth modification; and FIG. 19 is a diagram illustrating a multi-pass recording control by an ink jet recording device according to a fifth modification.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 2A:
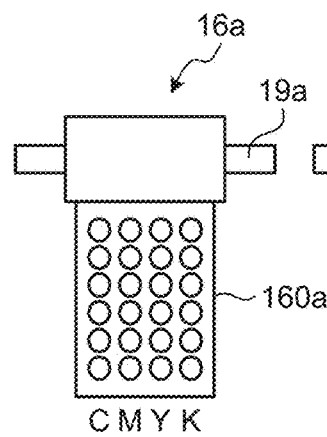
FIGS. 2A to 2C are schematic diagrams illustrating an exemplary configuration of a recording head.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

It is an object of the present invention to provide a liquid discharging device, a liquid discharging method, and a computer program product which can remedy image unevenness caused by a serial scanning, connected longer-length head.

Hereinafter, a liquid discharging device, a liquid discharging method, and a computer program product according to an embodiment of the present invention will be described in detail with reference to the accompanying drawings. The following embodiment and modifications are merely exemplary and unintended to limit the scope of the present invention. The following embodiment and modifications include elements and components readily conceivable by a person skilled in the art, substantially the same, and equivalents. Various omissions, substitutions, modifications, and combinations of the elements and components can be made without departing from the gist of the following embodiment.

General Configuration of Ink Jet Recording Device

FIG. 1 is a schematic diagram illustrating an exemplary configuration of an ink jet recording device according to an embodiment. The general configuration of an ink jet recording device 10 according to the present embodiment will be described with reference to FIG. 1.

Ink jet recording devices are originally developed for use of A4-size paper, and then advanced as photo printers and business document recording devices. Ink jet recording devices become able to handle larger-size paper such as A4, A3, A2, and A1, and larger-size ink jet recording devices for use in sign graphics as posters and wallpaper are developed. Serial-scanning ink jet recording devices include head units significantly smaller than the width of a recording medium and relatively move on the recording medium for image generation, which is advantageous in terms of simpler structure and lower price. However, along with the enlargement of an ink jet recording device, a head unit is to grow in size accordingly. Otherwise, the head unit needs to scan a larger number of times and the ink jet recording device cannot increase practical productivity. Thus, along with enlargement of paper size, larger-size head units and connected longer-length heads of connected head modules are developed. The ink jet recording device 10 according to the present embodiment includes a connected, longer-length recording head of connected head modules. The general structure of the ink jet recording device 10 will be described below.

As illustrated in FIG. 1, the ink jet recording device 10 according to the present embodiment includes a recording head 16, a stage 17, a sub-scanning driver 18, a guide rod 19, and a control unit 50.

The recording head 16 represents a connected, longer-length ink-jet head. The recording head 16 includes a plurality of nozzles which discharges ink droplets (an exemplary liquid) onto a recording medium P to form dots, thereby generating an image. The recording head 16 discharges ink droplets while scanning in a reciprocative manner along the guide rod 19 (guide) in a main-scanning direction. The nozzles are arranged in arrays by color in a sub-scanning direction being a conveying direction of the recording medium P, as will be described later. The nozzles are placed in the recording head 16 to discharge ink droplets toward the stage 17 on which the recording medium P is placed. The guide rod 19 may be a rail or a plate as long as it functions to support the recording head 16 and serves as a scanning route in the main-scanning direction.

The sub-scanning driver 18 serves to convey the recording medium P with respect to the recording head 16 in the sub-scanning direction. The sub-scanning driver 18 includes a motor, for example. Alternatively, the sub-scanning driver 18 may move the recording head 16 in the sub-scanning direction to convey the recording medium P, instead of moving the recording medium P.

The control unit 50 controls the operations of respective elements of the ink jet recording device. The control unit 50 controls, for example, the sub-scanning driver 18 and the recording head 16 to move in the main-scanning direction and discharge ink droplets. To cause the recording head 16 to discharge ink droplets to form dots, the control unit 50 controls the recording head 16 and the sub-scanning driver 18 to scan in the main-scanning direction and convey the recording medium P in the sub-scanning direction alternately. To cause the recording head 16 to discharge ink droplets while scanning in the main-scanning direction, the control unit 50 performs multi-pass recording control, that is, forming dots in the main-scanning direction by discharging ink droplets from different nozzles by multiple scanning. Through the multi-pass recording control, the ink jet recording device can form images with higher resolution beyond the density limit of the nozzles 22 of the recording head 16 and the limit of required drive frequency of the recording head 16 for discharging ink droplets. The multi-pass recording control will be described in detail with reference to (a) to (c) of FIG. 6.

General Structure of Recording Head

Figure 2B:
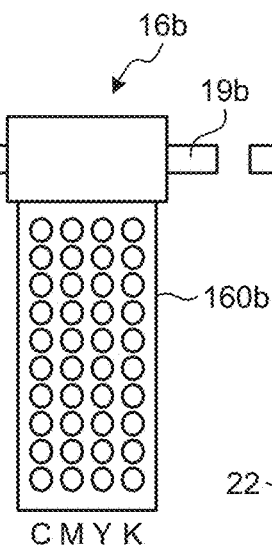
Figure 2C:
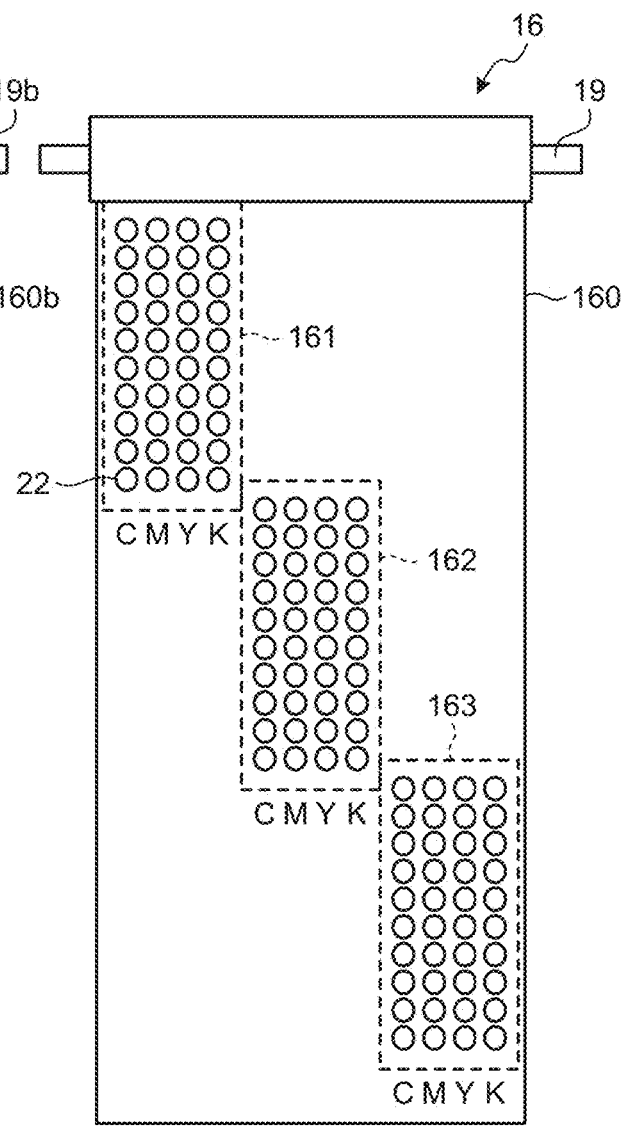
Figure 3A:
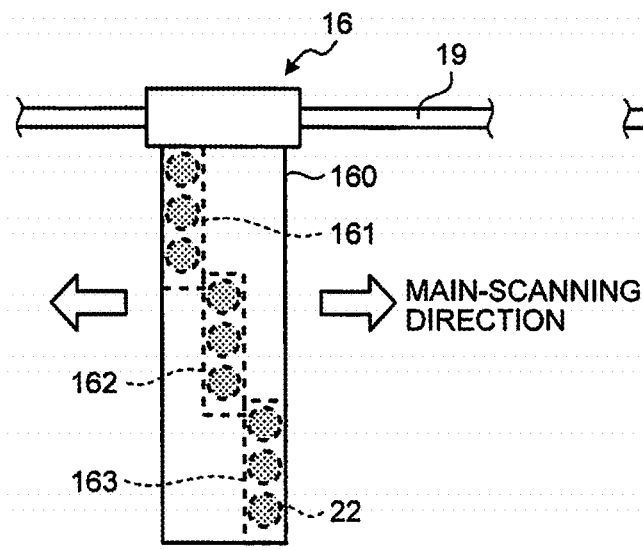
FIGS. 3A to 3D illustrate diagrams of mechanical variable factors of the recording head.
Figure 3B:
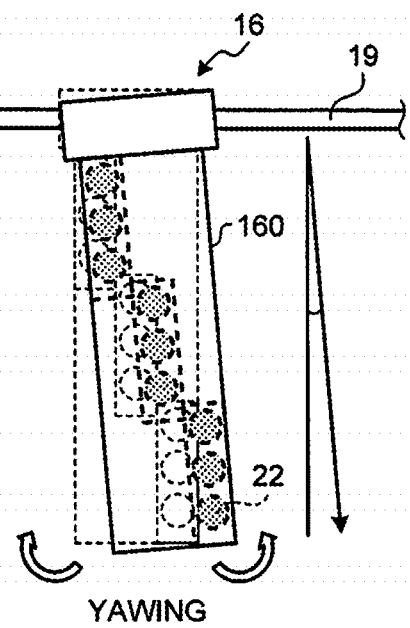
Figure 3C:
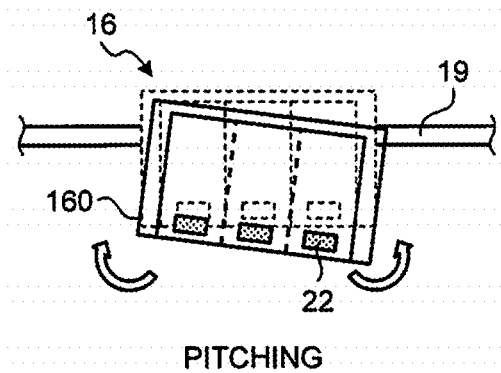
Figure 3D:
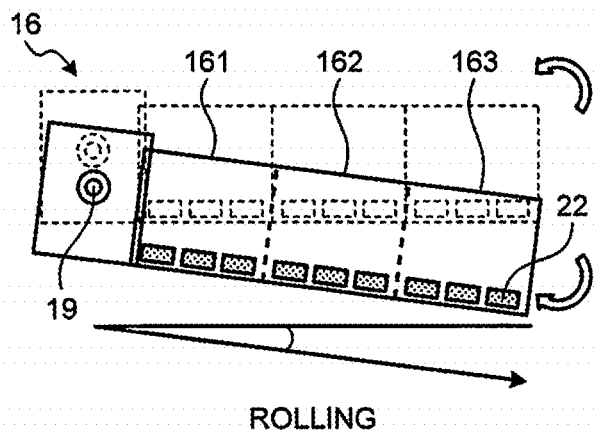

FIGS. 2A to 2C are schematic diagrams illustrating an exemplary structure of a recording head. General structure of recording heads will be described with reference to FIGS. 2A to 2C.

A recording head 16a illustrated in FIG. 2A is an integrated shorter-length head for small-size ink jet recording devices for use at home or office. The recording head 16a includes a molded head unit 160a of nozzle arrays of cyan (C), magenta (M), yellow (Y), and black (K). The recording head 16a scans in a reciprocative manner along a guide rod 19a in the main-scanning direction. The integrated shorter-length recording head 16a for use at home or office is as short as about one inch in length at most in view of a compact size of the ink jet recording device.

A ink jet recording device for sign graphics forms images on a larger-size recording medium than the one printed by the compact ink jet recording device with the recording head 16a. Thus, the ink jet recording device for sign graphics uses an integrated longer-length recording head 16b, illustrated in FIG. 2B, larger by about two inches than the recording head 16a since a small head as the recording head 16a deteriorates efficiency. The recording head 16b includes a molded head unit 160b of nozzle arrays of C, M, Y, and K colors. The recording head 16b scans in a reciprocative manner along a guide rod 19b in the main-scanning direction.

In order to handle a larger recording medium, as illustrated in FIG. 2C, an ink jet recording device incorporates the connected longer-length recording head 16 of the head units 160b illustrated in FIG. 2B. As mentioned above, the ink jet recording device 10 of the present embodiment incorporates the connected longer-length recording head 16 illustrated in FIG. 2C. Hereinafter, individual heads to be connected together will be referred to as head modules, and the entire connected head will be referred to as a head unit. As illustrated in FIG. 2C, the recording head 16 of the present embodiment includes a head unit 160 of three head units 160b connected in a staggered layout illustrated in FIG. 2B as head modules. As illustrated in FIG. 2C, the three head modules of the head unit 160 are referred to as a first head module 161, a second head module 162, and a third head module 163, as seen from the guide rod 19.

The recording heads 16b illustrated in FIG. 2B are connected not to elongate the length but in such a manner as illustrated in FIG. 2C because, typically, an ink-jet recording head including a larger number of nozzles is more difficult to uniformly discharge ink droplets and a longer-length head with higher discharge accuracy is very expensive. As for a line-head ink jet recording device including a head unit of a length equal to the width of a recording medium, such a head unit is typically of a connected type. However, the head modules of such a line-head ink jet recording device are more expensive due to discharge accuracy for achieving single-pass image generation and high-frequency drivability and durability to deal with a production volume far greater than that of a serial-scanning ink jet recording device.

Mechanical Variable Factors of Serial Recording Head and their Influences

FIG. 3 illustrates diagrams (a) to (d) of mechanical variable factors of the recording head. FIG. 4 illustrates diagrams (a) to (d) of the influences of mechanical variable factors on dot-landing positions. FIG. 5 is a graph depicting fluctuations in landing positions in the sub-scanning direction due to variations in the conveying amount of a recording medium when the integrated head scans three times. Mechanical variable factors of the connected longer-length recording head 16 of the present embodiment and the influences of such mechanical variable factors on dot-landing positions will be described with reference to FIGS. 3 to 5.

The following will describe mechanical variable factors that may be caused by scanning of the recording head 16 in the main-scanning direction illustrated in (a) of FIG. 3. The recording head 16 travels along the axis of the guide rod 19. Examples of the mechanical variable factors include yawing, pitching, and rolling. Herein, yawing refers to a motion about an axis perpendicular (up-down) to the traveling direction (front-back) of the recording head 16, as illustrated in (b) of FIG. 3. Pitching refers to a motion about an axis perpendicular (right-left) to the traveling direction (front-back) of the recording head 16, as illustrated in (c) of FIG. 3. Rolling refers to a motion about an axis corresponding to the traveling direction (front-back) of the recording head 16, as illustrated in (d) of FIG. 3.

The larger and the longer the head unit is, the greater the fluctuations in these mechanical variable factors are. As a result, the nozzles 22 closer to the guide rod 19 and the nozzle 22 at the end of the head unit 160 largely differ in terms of ink dot-landing accuracy. In such a case, the fluctuations in the mechanical variable factors can be abated depending on the device structure. For example, the single guide rod 19 illustrated in (a) to (d) of FIG. 3 may be increased to two or more for increasing supports, or the head unit 160 may be supported by guide rods at the front and rear ends. This, however, makes the recording head 16 in (a) to (d) of FIG. 3 more complex in structure and more expensive, which may require modification of the recording head 16 in terms of the driving method in order to operate the recording head 16 more powerfully and more accurately in the main scanning direction. Thus, to provide a desirable inexpensive structure, it is preferable to provide means for absorbing the fluctuations instead of improving mechanical accuracy.

Next, how fluctuations due to the mechanical variable factors illustrated in (a) to (d) of FIG. 3 affect dot-landing positions will be described with reference to (a) to (d) of FIG. 4 and FIG. 5. In recording a vertical line orthogonal to the main-scanning direction as illustrated in (a) of FIG. 4, in terms of yawing, the recording head 16 tilts as a pendulum, as illustrated in (b) of FIG. 4. Regarding pitching, the recording head 16 wobbles in the main-scanning direction as illustrated in (c) of FIG. 4. Regarding rolling, the recording head 16 tilts as illustrated in (d) of FIG. 4, causing a fluctuation in dot-landing position in the sub-scanning direction.

In addition, in actual recorded images, curving of spray intrinsic to the individual nozzles 22, variations in the conveying amount of a recording medium in the sub-scanning direction, and deformation of a recording medium are added as factors that decreases dot-landing accuracy. The graph illustrated in FIG. 5 represents fluctuations in landing positions due to variations in the conveying amount of a recording medium when the recording head 16 scans three times. Dot-landing positions change at the respective positions in the main-scanning direction (main-scanning positions), such as moving in parallel as a whole. As illustrated in FIG. 5, in the sub-scanning direction a maximum shift PP1 occurs at a particular main-scanning position, which will cause image unevenness with regularity, referred to as banding.

Multi-Pass Recording Control

FIG. 6 illustrates diagrams (a) to (c) of a multi-pass recording control. An example of multi-pass recording control will be described with reference to (a) to (c) of FIG. 6.

The diagrams (a) to (c) of FIG. 6 illustrate dividing a recording medium into two unit regions in the main-scanning direction and six unit regions in the sub-scanning direction for recording. For the sake of convenience, main-scanning directional division is referred to as pass, and sub-scanning directional division is referred to as interlace.

The division illustrated in (a) to (c) of FIG. 6 is referred to as a 2-pass and 6-interlace. Such multi-pass recording control is advantageous in enabling printing finer than the actual nozzle pitch by setting the division pitch to a smaller pitch, which makes it possible to generate high-resolution images. In the example in (a) to (c) of FIG. 6, in the case of the recording head 16 having a nozzle pitch of 150 (dpi), for example, feeding a recording medium by six unit regions in the sub-scanning direction makes it possible to form an image with a high resolution of 150×6=900 (dpi).

The diagram (b) of FIG. 6 depicts a relative position between a head part, including a particular nozzle array, of a recording head and a recording medium in the sub-scanning direction when the recording head includes a nozzle array of 22 nozzles arranged with spacing 150 (dpi) and the recording medium is conveyed in a direction from the nozzle denoted by "1" toward the nozzle denoted by "2". The numbers illustrated in (b) of FIG. 6 represent the positions and identification numbers of the nozzles (nozzle numbers). For example, the nozzle at the position "2" is referred to as a second nozzle. The height of the unit region corresponds to an amount of single conveyance of the recording medium. In the first scanning of the recording head, the first nozzle and the second nozzle discharge ink dots to the unit region. In the second scanning, the third nozzle and the fourth nozzle discharge ink dots. In the third scanning, the fifth nozzle and the sixth nozzle discharge ink dots. In the last twelfth scanning the twenty-second nozzle discharges ink dots.

Encircled numbers illustrated in (a) of FIG. 6 represent the order of discharging ink dots or droplets and a relationship among droplet positions in the unit region in the main-scanning direction. In FIG. 6 the diagram (c) illustrates correspondence between the encircled numbers in (a) of FIG. 6 and the nozzle numbers. In the example in (c) of FIG. 6, a droplet position moves from bottom to top from the first scanning to the sixth scanning. The droplet position moves from bottom to top from the seventh scanning, and the droplet position is switched between odd-numbered scanning and even-numbered scanning in the main-scanning direction. This makes it possible to enhance two-dimensional distribution effect as compared with simply setting the droplet positions of adjacent nozzles (e.g., the first nozzle and the third nozzle) to one immediately above the other. Moreover, with a large difference in dot-landing positions between the first nozzle and the twenty-second nozzle as yawing illustrated in (b) of FIG. 3, each of the 22 nozzles can be changed in position in the main-scanning direction and the sub-scanning direction to combine their shift characteristics to be able to reduce a degree of regular unevenness.

The larger the number of divisions of the recording medium in the main-scanning direction and the sub-scanning direction is, the higher the distribution effect is. However it takes longer length of time for printing the unit region, as a trade-off. For example, it takes a twelve times a longer length of time than the single-pass recording control, that is, simple nozzle-pitch recording. That is, it may be not possible to ensure a sufficient number of scans by means of the multi-pass recording control for the purpose of ensuring expected productivity, resulting in an insufficient degree of improvement. To address this, some actual products include a plurality of recording modes to which a different number of scans under multi-pass recording control is allocated, to allow the users to select the recording mode according to their need, for example. Examples of recording modes include a mode of an increased number of scans to prioritize image quality to productivity and a mode of a decreased number of scans to prioritize productivity to image quality.

The conventional serial-scanning ink jet recording device, i.e., the ink jet recording device incorporating the recording heads 16a and 16b illustrated in FIGS. 2A and 2B, respectively faces such an issue regarding the multi-pass recording control. The ink jet recording device 10 of the present embodiment improves periodic unevenness caused by a connected longer-length head structure as described below with reference to FIGS. 7A to 10C.

Influence of Mechanical Variable Factor of Connected Longer-Length Head

FIGS. 7A and 7B are diagrams depicting a positional relationship between head modules of a connected longer-length head. FIG. 8 are graphs (a) to (d) depicting fluctuations in dot-landing positions in the sub-scanning direction, which occur in the head modules of a connected longer-length head in a staggered layout. FIG. 9 illustrates diagrams (a) and (b) of an exemplary influence of a phase shift on an actual image. FIGS. 10A to 10C are enlarged diagrams depicting influences of phase shifts on actual images. Other influences of mechanical variable factors of the connected longer-length head will be described with reference to FIGS. 7A to 10C.

Unlike line-head head modules designed to be connected, integrated heads are originally designed for individual use. Consider that such integrated heads are combined. In this case, the head modules are arranged in a staggered manner such that the neighboring nozzles in the adjacent head modules are arranged at the same nozzle pitch as in continuous, unified nozzle arrays as illustrated in FIG. 7A. This is because in the head module for single use, power and signal cables (161b and 162b illustrated in FIG. 7B) and common liquid chambers connected to ink supply tubes (161a and 162a illustrated in FIG. 7B) interfere with the nozzles, for example, so that the nozzles cannot be arrayed at the same nozzle pitch between the connected modules as illustrated in FIG. 7B.

Such cables and common liquid chamber can be disposed above a head module. However, there are no available heads designed such that a nozzle at the end of a head module is apart from a frame end of another head module by a distance approximately equal to the nozzle pitch. This is because the nozzle pitch is much narrower than the thickness of the frame member of the head module so that setting the frame thickness to match the nozzle pitch will result in producing a thin and fragile frame. Such a very thin frame lacks in robustness suitable for the head module to withstand wiping when being in physical contact with a wiper for maintenance purpose. A nozzle array of the same color including nozzles placed at a different pitch will increase a computational load in rendering process and complicates the control over conveyance of a recording medium as well. Non-uniform conveyance of a recording medium makes it difficult to ensure conveyance accuracy and to manage ink drying time, which is likely to cause image unevenness resulting from conveying operation.

FIGS. 8A to 8D are graphs plotting sub-scanning fluctuations to depict dot-landing accuracy of head modules in a laterally staggered layout as illustrated in FIG. 7A. Along with a main-scanning operation, yawing, rolling, and pitching, for example, occur in the recording head 16 for structural reason. Thus, dot-landing accuracy varies depending on main-scanning positions. In addition, since the head length of the head unit 160 is elongated due to the connection of the head modules, a fluctuation increases toward the end of the head unit 160. Such an issue also occurs in the graph illustrated in FIG. 5. FIGS. 8A to 8D depicts examples that a phase shift occurs in mechanical fluctuations (sub-scanning fluctuations in the graphs in FIG. 8A to 8D) accumulated at ink-droplet discharging positions in the main-scanning direction and at the discharge timing in accordance with the arrangement of the head modules.

Figure 8A:
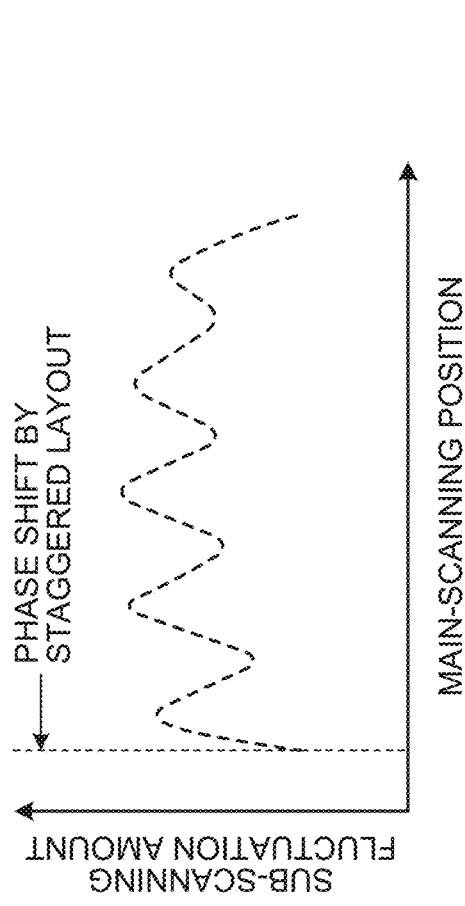
FIG. 8A to 8D are graphs depicting fluctuation in landing positions in the sub-scanning direction, which occurs in head modules in a connected longer-length head of a staggered layout.
Figure 8B:
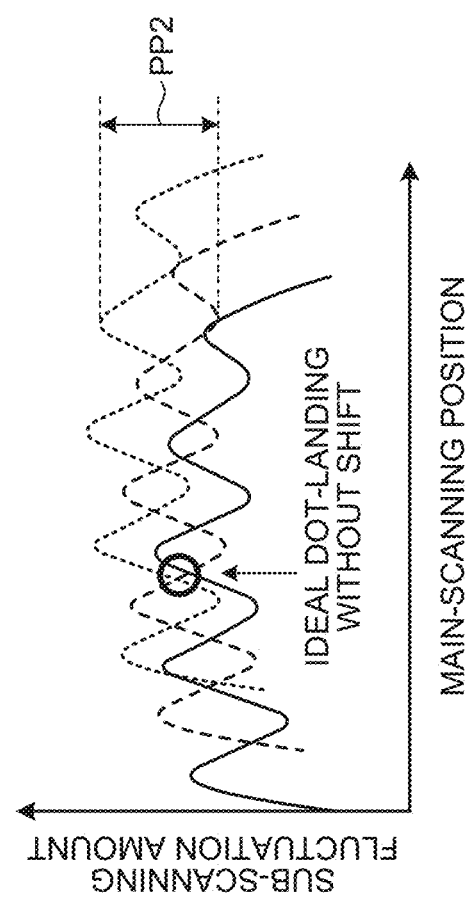
Figure 8C:
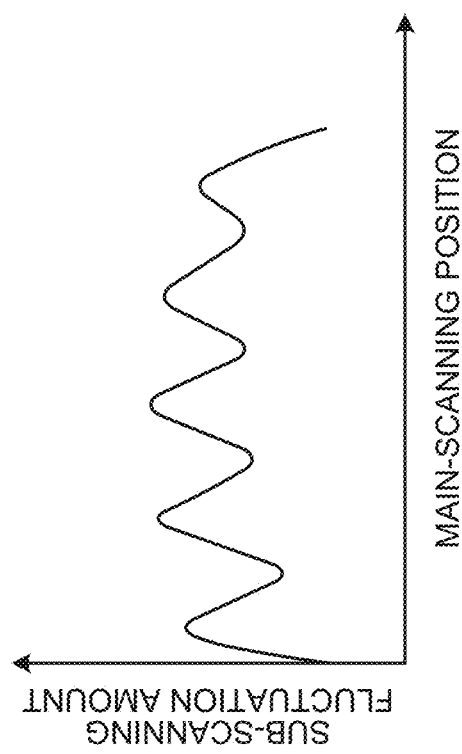
Figure 8D:
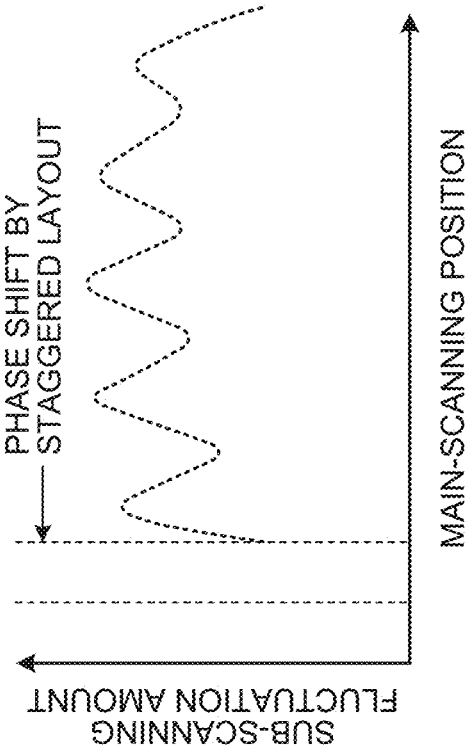

When the connected longer-length recording head 16 of the present embodiment illustrated in FIG. 2C scans from left to right, for example, the third head module 163 starts discharging first by a staggered amount between the head modules. In this case, the first head module 161 and the second head module 162 are outside the discharge region and thus discharge no ink droplets. That is, the discharge starting point of the third head module 163 will be a starting point of an image. Despite a staggered layout, the head modules are unified to be the head unit 160. Thus, mechanical fluctuations accumulated in the head modules basically exhibit similar forms, and increase in accordance with a distance from the guide rod 19. However, the discharging operation is associated with coordinates in the main-scanning direction, and mechanical fluctuations at the same coordinate in the main-scanning direction are likely to shift in phase by an amount between the staggered head modules. FIG. 8A is a graph depicting fluctuations in the first head module 161, FIG. 8B is a graph depicting fluctuations in the second head module 162, and FIG. 8C is a graph depicting fluctuations in the third head module 163. FIG. 8D is a graph depicting the fluctuations in the three head modules in an overlapping manner.

In the graph illustrated in FIG. 8D, shift amounts (sub-scanning fluctuations) among the head modules coincide with one another at a certain main-scanning position, that is, no difference in dot-landing positions among the head modules. Thus, the head unit 160 can ideally and accurately discharge or eject ink droplets. In contrast, at another main-scanning position, a maximum shift PP2 occurs between a peak and a lowest point of shift amounts among the head modules. At such a main-scanning position where the shift PP2 occurs, the head unit 160 lowers in dot-landing accuracy than a single head module discharging ink droplets, significantly lowering the quality of image formation.

With reference to (a) and (b) of FIG. 9, how the phase shift in FIGS. 8A to 8D appears on an actual image will be described next. An image illustrated in (a) of FIG. 9 represents a blue sky with clouds in the bottom. An image portion I1 surrounded by a dotted line includes no clouds. As illustrated in the enlarged image portion I1 in (b) of FIG. 9, a maximum shift in the dot-landing position causes a large gap on the image, and such a gap appears as a light cloud. At the coordinates right next to the image portion I1, the shift in the dot-landing position is minimal, and thus the color of the sky is rendered clearly. Similar fluctuations shift in phase and overlap with each other, so that a lower-quality image portion and a higher-quality image portion periodically appear on the image, thus creating unevenness of a checkered pattern and deteriorating image quality.

FIGS. 10A to 10C are enlarged view of images representing the influences of phase shifts on dot landing. An ideal dot-landing of a connected head is illustrated in FIG. 10B, as with an integrated head illustrated in FIG. 10A. With a maximal dot-landing shift due to a phase shift, dots appear with a large gap as illustrated in FIG. 10C. Since the nozzle pitch in the head modules is unchanged, the maximal phase shift may result in further enlarging the gap to one dot line arranged at a nozzle pitch from the dot landing illustrated in FIG. 10C.

The conventional multi-pass recording control may work to reduce such image unevenness due to a phase shift to some extent. However, to distribute image unevenness due to the maximum dot-landing shift exceeding that of an integrated head, the number of divisions in the main-scanning direction and the sub-scanning direction is to be further increased, which will significantly increase the number of scans. This results in lowering productivity, which is opposite to improving productivity by using a connected head. According to the present embodiment, the ink jet recording device incorporating the connected head includes the elements to operate for the purpose of reducing the occurrence of image unevenness due to a phase shift without lowering productivity.

Hardware Configuration of Ink Jet Recording Device

FIG. 11 is a diagram illustrating an exemplary hardware configuration of the ink jet recording device according to an embodiment. The hardware configuration of the ink jet recording device 10 according to the present embodiment will be described with reference to FIG. 11.

As illustrated in FIG. 11, the ink jet recording device 10 of the present embodiment includes the control unit 50, a main-scanning motor 72, a sub-scanning driver 73, an operation panel 74, and a storage 75. The sub-scanning driver 73 corresponds to the sub-scanning driver 18 illustrated in FIG. 1. As mentioned above, the ink jet recording device 10 includes the recording head 16 and the stage 17.

The control unit 50 serves to control the entire operations of the ink jet recording device 10. As illustrated in FIG. 11, the control unit 50 includes a central processing unit (CPU) 51, a read only memory (ROM) 52, a random access memory (RAM) 53, an application specific integrated circuit (ASIC) 54, an input/output (I/O) 55, a host interface 56, a head drive circuit 61, a main-scanning drive circuit 62, and a sub-scanning drive circuit 63.

The CPU 51 serves as a calculator to handle the control and operation of the entire ink jet recording device 10. The ROM 52 is a non-volatile memory that holds data and computer programs during power-off of the ink jet recording device 10. The RAM 53 is a volatile memory serving as a work area of the CPU 51.

The ASIC 54 is an integrated circuit for various signal processing to image data or print data, and image processing such as sorting, or for processing input and output signals to control the entire ink jet recording device 10.

The I/O 55 serves as an interface for receiving detection signals from various sensors, for example. The host interface 56 transmits and receives data and signals to and from an external device (for example, a personal computer (PC) 30 illustrated in FIG. 11). The host interface 56 is a network interface compliant with transmission control protocol/internet protocol (TCP/IP), for example. The host interface 56 may be an interface such as a universal serial bus (USB).

The head drive circuit 61 serves to drive and control the recording head 16. The head drive circuit 61 transfers image data in serial to a drive circuit of the recording head 16. The head drive circuit 61 generates a transfer clock, a latch signal necessary for transferring or determining transfer of the image data, and a drive waveform for use in discharging ink droplets from the recording head 16, to output the signals to the driver of the recording head 16. The driver of the recording head 16 selectively inputs a drive waveform corresponding to the inputted image data to a piezoelectric element (actuator) of each nozzle of the recording head 16.

The main-scanning drive circuit 62 serves to control the driving of the main-scanning motor 72 under the control of the CPU 51 to control the movement of the recording head 16 in the main-scanning direction. The main-scanning motor 72 rotates to move or scan the recording head 16 in the main-scanning direction.

The sub-scanning drive circuit 63 serves to drive the sub-scanning driver 73 under the control of the CPU 51. The sub-scanning driver 73 serves to convey the recording medium P in the sub-scanning direction.

The operation panel 74 includes an input function for receiving various inputs in accordance with a user's operation and a display function for displaying various information such as information corresponding to the received operation and information indicating an operational status of the ink jet recording device 10. The operation panel 74 may include operation buttons and a display such as a liquid crystal display. In this case, the operation buttons implement the input function, and the display unit implements the display function. Alternatively, the operation panel 74 may include a liquid crystal display (LCD) having a touch-screen function, for example, instead of the operation buttons and the display.

The storage 75 represents a non-volatile memory device for storing various kinds of data. The storage 75 can be a flash memory, for example. The storage 75 stores, for example, image data from the PC 30.

The hardware configuration of the ink jet recording device 10 illustrated in FIG. 11 is merely presented by way of example. The ink jet recording device 10 may not include all of the elements illustrated in FIG. 11, or may include other elements.

Functional Block Configuration of Ink Jet Recording Device

Figure 12:
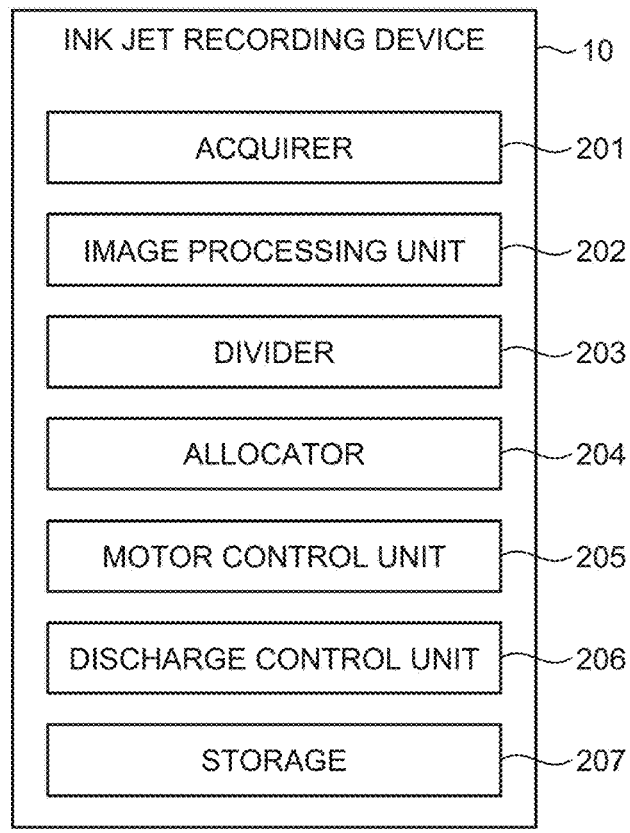
FIG. 12 is a diagram depicting an exemplary functional block configuration of an ink jet recording device according to an embodiment.

FIG. 12 is a diagram depicting an exemplary functional block configuration of the ink jet recording device according to an embodiment. The functional block configuration of the ink jet recording device 10 according to the present embodiment will be described with reference to FIG. 12.

As illustrated in FIG. 12, the ink jet recording device 10 includes an acquirer 201, an image processing unit 202, a divider 203, an allocator 204, a motor control unit 205, a discharge control unit 206, and a storage 207.

The acquirer 201 represents a functional element that acquires image data received by the host interface 56 from an external device (such as the PC 30, for example). The image data acquired by the acquirer 201 includes three-color information on red (R), green (G), and black (R), for example.

The image processing unit 202 represents a functional element that converts the image data (RGB data) acquired by the acquirer 201 into CMYK data to be handled by the ink jet recording device 10. The image processing unit 202 also performs gamma correction to reflect the characteristics of the ink jet recording device 10 and a user's preference. The image processing unit 202 further performs halftone processing. The halftone processing refers to quantization of CMYK gray-scale data (typically eight bits for each color) to data (typically of one to three bits) to be handled by the ink jet recording device 10. Through the halftone processing, the image data is converted to dot data.

The divider 203 represents a functional element that divides the dot data after the image processing by the image processing unit 202, into unit regions for multi-pass recording control, as illustrated in (a) to (c) of FIG. 6. The operations under multi-pass recording control of the present embodiment will be described later in detail with reference to FIG. 13 and (a) and (b) in FIG. 14.

The allocator 204 represents a functional element that performs rendering. The rendering refers allocating pixels of the unit regions of the dot data after the halftone processing, to the nozzles for discharging ink droplets for scanning. The rendering of the present embodiment will be described later in detail with reference to FIG. 13 and (a) and (b) in FIG. 14.

The motor control unit 205 represents a functional element that controls the movement of the recording head 16 and conveyance of a recording medium in the sub-scanning direction. Specifically, the motor control unit 205 controls operations of the main-scanning drive circuit 62 to move or scan the recording head 16, and controls operations of the sub-scanning drive circuit 63 to convey a recording medium.

The discharge control unit 206 represents a functional element that controls timing and amount of ink droplet discharging from the recording head 16 driven by the head drive circuit 61 by sending the dot data after the rendering by the image processing unit 202 to a printer engine, to control the operation of the head drive circuit 61.

The acquirer 201, the image processing unit 202, the divider 203, the allocator 204, the motor control unit 205, and the discharge control unit 206 illustrated in FIG. 11 are implemented by the CPU 51's executing computer programs. Part or all of the acquirer 201, the image processing unit 202, the divider 203, the allocator 204, the motor control unit 205, and the discharge control unit 206 may be implemented not by computer programs (i.e., software) but by hardware circuitry such as a field-computer programmable gate array (FPGA) or the ASIC 54.

The storage 207 represents a functional element that stores various kinds of data such as image data and dot data. The storage 207 is implemented by a memory device such as the RAM 53 or the storage 75 illustrated in FIG. 11.

The functional elements of the ink jet recording device 10 illustrated in FIG. 12 represent the concepts of functions, and are not limited to such elements. For example, part of the independent functional elements of the ink jet recording device 10 illustrated in FIG. 12 may be configured as a single functional element. Alternatively, a function of a single functional element of the ink jet recording device 10 illustrated in FIG. 12 may be divided into a plurality of functional elements.

Printing Process of Ink Jet Recording Device

Figure 13:
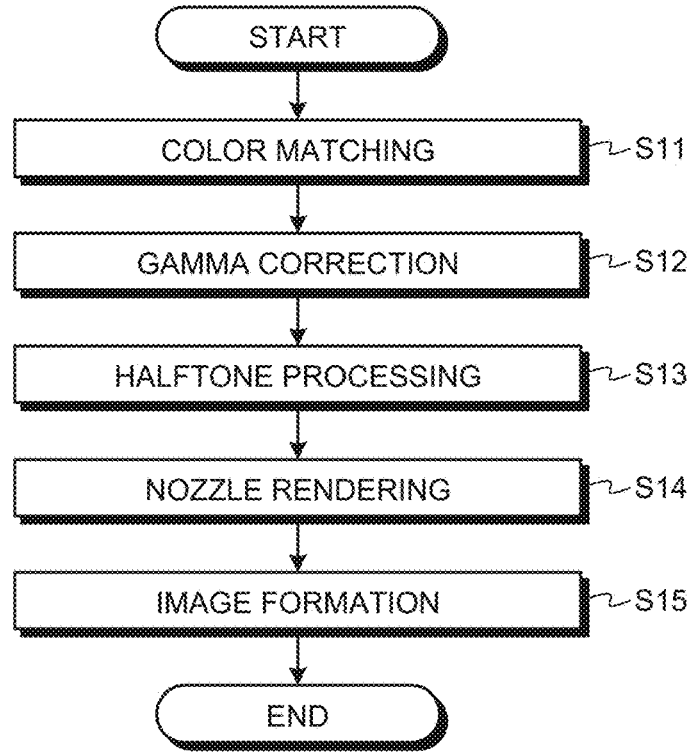
FIG. 13 is a flowchart of an exemplary printing operation of an ink jet recording device according to an embodiment.
Figure 14A:
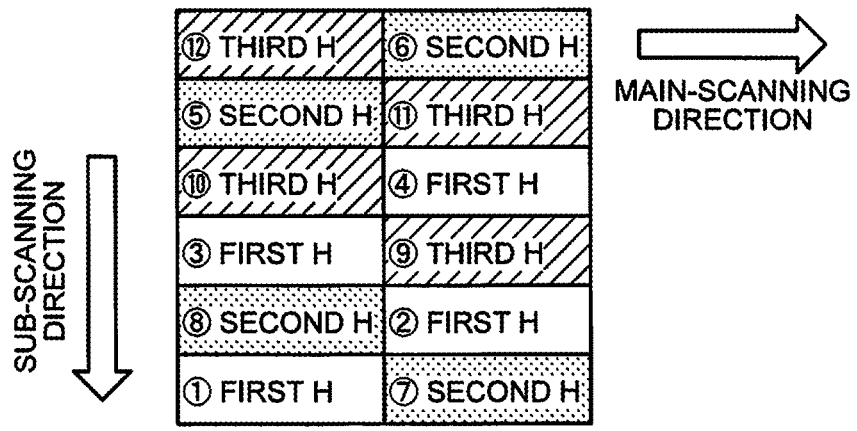
FIGS. 14A and 14B illustrate diagrams of a multi-pass recording control by an ink jet recording device according to an embodiment.
Figure 14B:
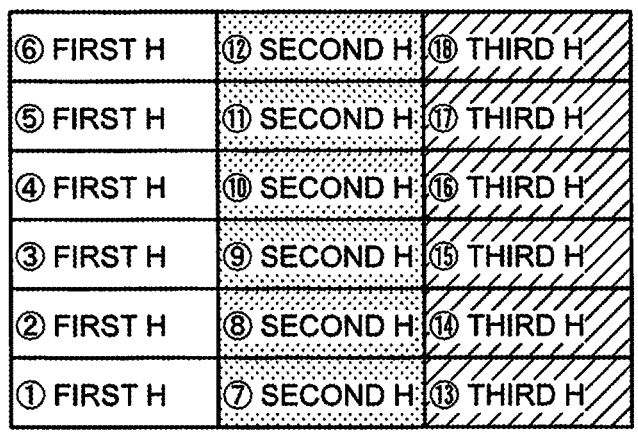

FIG. 13 is a flowchart depicting an exemplary printing process of the ink jet recording device according to the embodiment. FIG. 14 illustrates diagrams (a) and (b) of the multi-pass recording control of an ink jet recording device according to an embodiment. With reference to FIG. 13 and (a) and (b) of FIG. 14, the printing process and the multi-pass recording control of the ink jet recording device 10 according to the present embodiment will be described. Encircled numbers in (a) and (b) of FIG. 14 represent the order in which dots or ink droplets are discharged and a relationship among droplet positions in a unit region in the main-scanning direction. In (a) and (b) of FIG. 14, the first head module 161 is denoted by first H, the second head module 162 is denoted by second H, and the third head module 163 is denoted by third H. The same applies to the following diagrams.

Step S11:

The acquirer 201 acquires image data received by the host interface 56 from an external device (such as the PC 30, for example). The image processing unit 202 performs color matching to convert the image data (RGB data) acquired by the acquirer 201 into CMYK data to be handled by the ink jet recording device 10. The image processing unit 202 then proceeds to step S12.

Step S12:

The image processing unit 202 performs gamma correction to the image data after the color matching, so as to reflect the characteristics of the ink jet recording device 10 and a user's preference. The image processing unit 202 then proceeds to step S13.

Step S13:

The image processing unit 202 performs halftone processing to the image data after the gamma correction, so as to convert the image data into dot data. The process then proceeds to step S14.

Step S14:

The divider 203 divides the dot data converted by the image processing unit 202, into unit regions for the multi-pass recording control in the present embodiment. The allocator 204 determines which one of the nozzles and by which order of scanning discharges ink droplets to the pixels of each unit image in each of the unit regions of the dot data through rendering compliant with the multi-pass recording control of the present embodiment. The rendering compliant with the multi-pass recording control of the present embodiment will be described below with reference to (a) and (b) of FIG. 14.

To prevent a phase shift causing the maximum dot-landing shift with reference to FIGS. 8A to 8D, the multi-pass recording control of the present embodiment serve to separate the dot-landing shifts with different phases, considering that image unevenness is caused by dot-landing shifts with different phases appearing at random in the same unit region, as illustrated in (a) of FIG. 14. Specifically, the allocator 204 separates respective coordinates (main-scanning coordinates in the example illustrated in (b) of FIG. 14) at which the head modules (the first head module 161, the second head module 162, and the third head module 163) discharge ink droplets, in unit of dot row as illustrated in (b) of FIG. 14. That is, the allocator 204 performs rendering such that the nozzles of the same head module discharge ink droplets in the same dot row in a unit region in the sub-scanning direction, as illustrated in (b) of FIG. 14. The same head module discharges ink droplets in unit of row, which can be dealt with the number of scans about the same as that of the conventional multi-pass recording control.

Through such rendering, the nozzles of the same head module discharge ink droplets in each dot row in a unit region in the sub-scanning direction, which cause no phase shift between the dots of the dot row. The diagram (a) of FIG. 14 depicts 2-pass and 6-interlace multi-pass recording control. In this case, scanning is performed in divided manner, twice in the main-scanning direction and six times in the sub-scanning direction, i.e., a total of 12 scans. In the multi-pass recording control illustrated in (b) of FIG. 14, scanning is performed three times in the main-scanning direction and six times in the sub-scanning direction, i.e., a total of 18 scans larger than the total in (a) of FIG. 14. However, it causes no maximum shift between peaks in the sub-scanning direction due to a phase shift, which can remedy image unevenness due to such a phase shift.

The process then proceeds to step S15.

Step S15:

The discharge control unit 206 transfers the dot data after the rendering by the allocator 204, to the printer engine to control the printer engine to form an image on a recording medium on the basis of the dot data, in cooperation with the control by the motor control unit 205. This completes the print process.

As described above, the ink jet recording device 10 of the present embodiment performs rendering such that the nozzles of the same head module discharge ink droplets in the same dot row of the unit region of dot data in the sub-scanning direction. Through such rendering, the same dot row of the unit region in the sub-scanning direction is formed of the ink droplets discharged from the nozzles of the same head module, which causes no phase shift between the dots in each dot row and no maximum shift between the peaks in the sub-scanning direction, which would otherwise occur due to such a phase shift. This makes it possible to remedy image unevenness arising from such a phase shift.

First Modification

Figure 15:
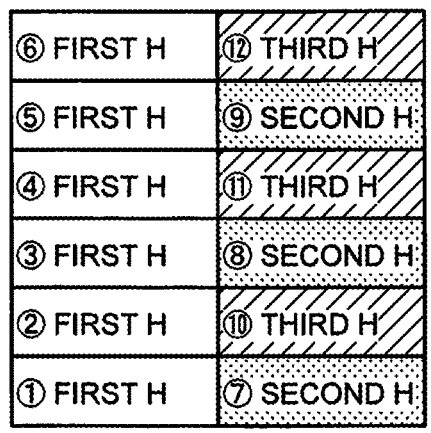
FIG. 15 is a diagram illustrating a multi-pass recording control by an ink jet recording device according to a first modification.

FIG. 15 is a diagram illustrating a multi-pass recording control of an ink jet recording device according to a first modification. Multi-pass recording control of the ink jet recording device 10 according to the present modification will be described with reference to FIG. 15.

As described above with reference to (a) to (d) of FIG. 3, the more distanced from the guide rod 19 the recording head 16 is, the larger the mechanical fluctuation is. That is, the use of a head module closer to the guide rod 19 increases ink-droplet discharging accuracy. In view of this, in the present modification among the head modules of the recording head 16, the first head module 161 closest to the guide rod 19 is preferentially set to form dots of the same dot row, as illustrated in FIG. 15. That is, a large part (a half in the example of FIG. 15) of an image is formed from the ink droplets discharged from the first head module 161, to thereby ensure general image quality. The second head module 162 and the third head module 163, with lower accuracy than the first head module 161, are set to discharge ink droplets to form the remaining dot rows. That is, the same dot row includes the ink droplets discharged by the second head module 162 and the ink droplets discharged by the third head module 163. In the example illustrated in FIG. 15, in the same dot row the ink droplets from the second head module 162 and the ink droplets from the third head module 163 alternately appear. Thus, the ratio of ink droplets discharged by the first head module 161 is higher than the ratio of ink droplets discharged by each of the other head modules (the second head module 162 and the third head module 163).

In the multi-pass recording control illustrated in (b) of FIG. 14, the number of scans is 1.5 times larger than in (a) of FIG. 14, which means decrease in productivity. In the present modification, the number of scans under the multi-pass recording control is decreased to allow a dot-landing shift due to a phase shift to occur in part of dot rows, and the first head module 161 with higher accuracy is set to discharge ink droplets to form a large part (a half in FIG. 15) of an image. That is, a phase shift between the second head module 162 and the third head module 163 is less than a phase shift between the first head module 161 and the third head module 163, so that the same dot row can include both dots from the second head module 162 and dots from the third head module 163. This can reduce deterioration in productivity and in image quality.

The first modification has described the example that the head unit 160 of the recording head 16 includes three connected head modules (the first head module 161, the second head module 162, and the third head module 163). However, the present invention is not limited thereto. The head unit 160 may include four connected head modules, for example. In this case the first and second head modules may be given higher priority since the closer to the guide rod 19 the head module is, the higher the dot-landing accuracy the head module exerts. More specifically, the first head module may form one dot row, the second head module may form another dot row, and the third and fourth head modules both form the remaining dot rows.

Second Modification

Figure 16A:
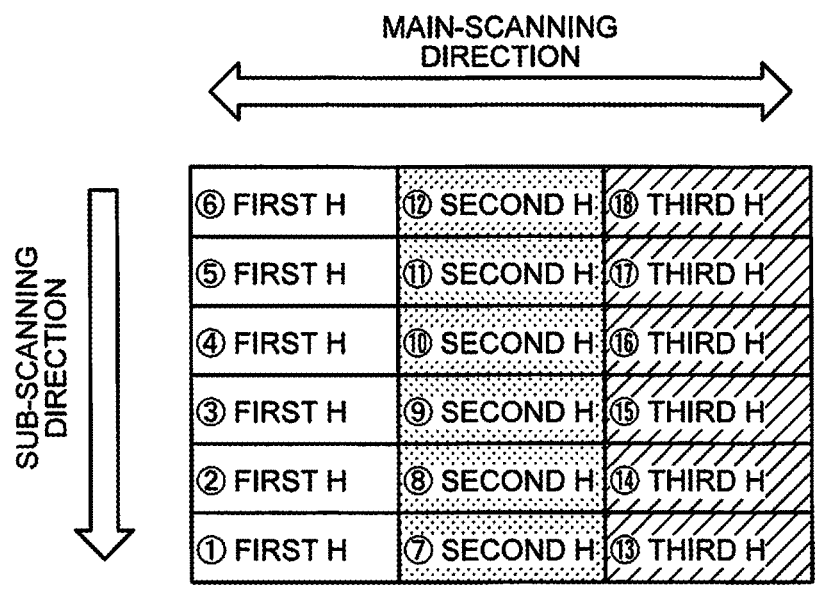
FIGS. 16A and 16B illustrate diagrams of a multi-pass recording control by an ink jet recording device according to a second modification.
Figure 16B:
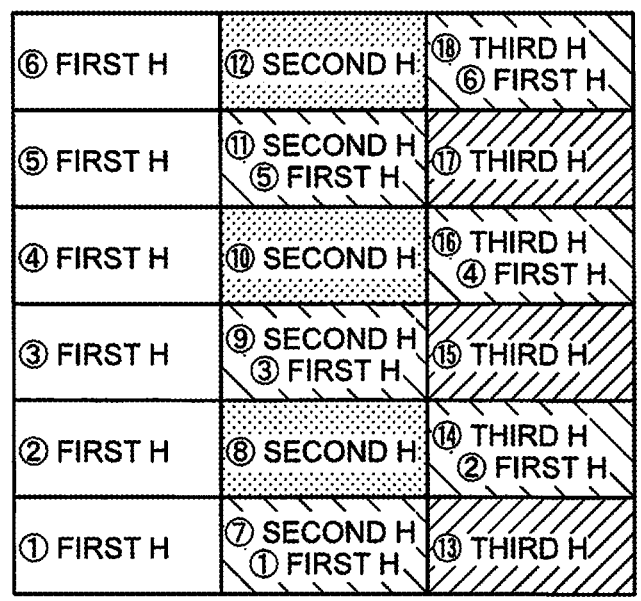

FIG. 16 are diagrams (a) and (b) illustrating a multi-pass recording control of an ink jet recording device according to a second modification. Multi-pass recording control of the present modification is more advanced than that in (b) of FIG. 14 in which scanning is performed in a divided manner, three times in the main-scanning direction and six times in the sub-scanning direction, i.e., a total of 18 scans. Such a control will be described with reference to (a) and (a) of FIG. 16.

The diagram (a) of FIG. 16 illustrates the multi-pass recording control illustrated in (b) of FIG. 14. The recording head 16, capable of discharging ink droplets to attain recording at main-scanning resolution by one main-scanning, can eject ink droplets onto pixels of dot data in the same position by multiple scans in an overlaid manner. In view of this, in the present modification the allocator 204 performs rendering such that the first head module 161 ejects ink droplets onto the same dot row formed by the second head module 162 and the same dot row formed by the third head module 163 as illustrated in (b) of FIG. 16. To be more specific, the first head module 161 starts discharging ink droplets first, therefore, the first head module 161 discharges ink droplets to expected dot positions of the second head module 162 and the third head module 163. The diagram (b) in FIG. 16 depicts that the first head module 161 discharges, by the sixth scanning, ink droplets onto the same pixel where the third head module 163 is to discharge ink droplets by the eighteenth scanning. That is, the ratio of ink droplets discharged by the first head module 161 is higher than the ratio of ink droplets discharged by each of the other head modules (the second head module 162 and the third head module 163).

This heightens the discharge rate of the first head module 161 with the highest dot-landing accuracy, further reducing image unevenness. In this case, the first head module 161 ejects ink droplets onto the same pixels of dot data in an overlaid manner, however, the second head module 162 and the third head module 163 are not excluded or restricted from discharging ink droplets. This is because if the second head module 162 and the third head module 163 are excluded, a maximum dot-landing shift due to a phase shift may occur among dots.

The second head module 162 and the third head module 163 are not restricted from forming dots, so that in addition to the combination of modules causing a phase shift, e.g., the second head module 162 and the third head module 163, the head module with intermediate characteristics therebetween (in this case, the first head module 161) discharges ink droplets, which are likely to fill the gaps in image unevenness.

The diagram (b) of FIG. 16 depicts that the first head module 161 discharges ink droplets onto the same dot rows formed by both the second head module 162 and the third head module 163 in an overlaid manner. However, the present invention is not limited thereto. For example, the first head module 161 discharges ink droplets onto the same dot rows formed by either the second head module 162 or the third head module 163.

Third Modification

Figure 17A:
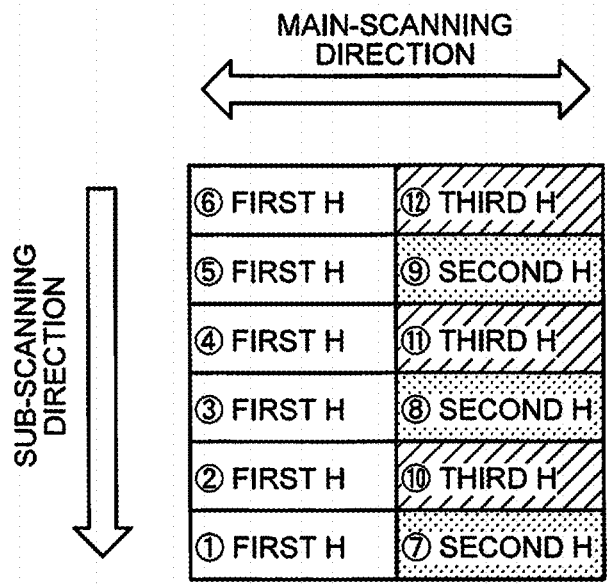
FIGS. 17A and 17B illustrate diagrams of a multi-pass recording control by an ink jet recording device according to a third modification.
Figure 17B:
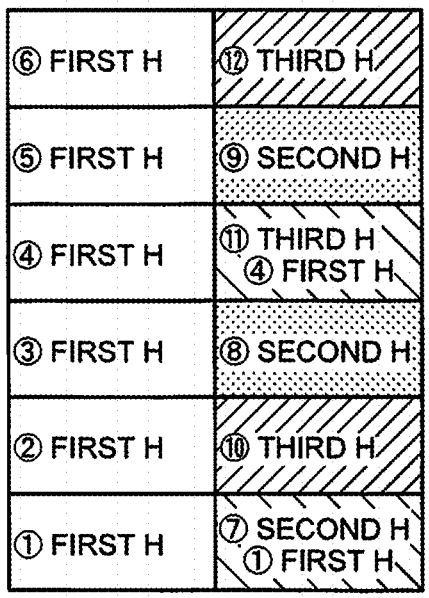

FIG. 17 illustrates diagrams (a) and (b) of a multi-pass recording control of an ink jet recording device according to a third modification. Multi-pass recording control of the present modification is more advanced than that of the first modification with reference to FIG. 15, which will be described with reference to (a) and (b) of FIG. 17.

The diagram (a) of FIG. 17 illustrates the multi-pass recording control illustrated in FIG. 15. As mentioned above, the recording head 16, capable of discharging ink droplets to attain recording at main-scanning resolution by one main-scanning, can eject ink droplets onto pixels of dot data in the same position by multiple scans in an overlaid manner. In view of this, in the present modification the allocator 204 performs rendering such that the first head module 161 ejects ink droplets on the dot rows of dots formed by both the second head module 162 and the third head module 163 as illustrated in (b) of FIG. 17. To be specific, the first head module 161 starts discharging ink droplets first, therefore, the first head module 161 discharges ink droplets to expected dot positions of the second head module 162 and the third head module 163. The diagram (b) of FIG. 17 depicts that the first head module 161 discharges, by the fourth scanning, ink droplets onto the same pixel where the third head module 163 is to discharge ink droplets by the eleventh scanning. Thus, the ratio of ink droplets discharged by the first head module 161 is higher than the ratio of ink droplets discharged by each of the other head modules (the second head module 162 and the third head module 163).

This heightens the discharge rate of the first head module 161 with the highest dot-landing accuracy, which can further remedy image unevenness. In this case, the first head module 161 ejects ink droplets onto the same pixels of dot data in an overlaid manner, however, the second head module 162 and the third head module 163 are not excluded or restricted from discharging ink droplets. This is because if the second head module 162 and the third head module 163 are excluded, a maximum dot-landing shift due to a phase shift may occur among dots.

The second head module 162 and the third head module 163 are not restricted from forming dots, so that in addition to the combination of modules causing a phase shift, e.g., the second head module 162 and the third head module 163, the head module with intermediate characteristics therebetween (in this case, the first head module 161) discharges ink droplets, which are likely to fill the gaps in image unevenness.

Fourth Modification

FIG. 18 is a diagram illustrating a multi-pass recording control of an ink jet recording device according to a fourth modification. Multi-pass recording control of the ink jet recording device 10 according to the present modification is applied to the heads or nozzle arrays of the four colors, which will be described with reference to FIG. 18.

The above embodiment and modifications has assumed that the heads or nozzle arrays of the four colors are disposed at the same positions in the sub-scanning direction. The heads or nozzle arrays may be, however, slightly offset from one another due to limitation to head module-arrangement and nozzle-array allocation. In such a case, the multi-pass recording control of the ink jet recording device 10 is also applicable to the head modules of different color patterns. In the present modification, the first head module 161 with higher priority discharges ink droplets to form dot rows of different colors, as illustrated in FIG. 18. That is, in the case of printing in a mixed color of two or more colors, dot rows formed by the preferential first head module 161 and dot rows formed by the head module distant from the guide rod 19 are mixed between the colors.

Thus, the first head module 161 having higher dot-landing accuracy forms dot rows in different colors row by row, which makes it possible to ensure the accuracy of dot arrangement forming a mixed color on a plane. In addition, simultaneously discharging ink droplets of different colors to the same position can prevent occurrence of blur or bleeding, color muddiness, or beading, for example.

Fifth Modification

FIG. 19 is a diagram illustrating a multi-pass recording control of an ink jet recording device according to a fifth modification. Multi-pass recording control according to the present modification will be described with reference to FIG. 19.

As described above in the fourth modification, dot row allocation by color is most preferable. However, dot rows may be separated by at least three C, M, and K colors excluding Y (yellow) which has small difference in brightness from a white recording medium as a basis material and does not exert unevenness conspicuously, or by two C and M colors further excluding black (K) less likely to be used alone except for letters and line drawing, as illustrated in FIG. 19.

The reason why conspicuous black (K) can be excluded is that black (K) is mostly used as a secondary color or a tertiary color to represent contrast or depth in a shadowed area except for letters and line drawing, thus increasing the effect of the other color printed at the same time to cover the gaps due to a phase shift. For photography or graphic image recording rather than for letters and line drawing, black dot rows may not be separated. For letters and line drawing, black dot-landing accuracy matters, so that separation of the black dot rows is preferable.

While the embodiment and modifications have described the example that the head unit 160 includes three head modules (the first head module 161, the second head module 162, and the third head module 163), the present invention is not limited thereto. That is, the embodiment and modifications can be applied to a head unit including two head modules or four or more head modules connected together.

The functions in the above embodiment and modifications can be implemented by one or more processing circuits. The processing circuits refer to processors implemented by electronic circuitry or programmed to implement the functions by software, and devices such as ASICs, digital signal processors (DSPs), FPGAs, system-on-chips (SoCs), graphics processing units (GPUs), and conventional circuit modules designed to execute the above functions.

In the above embodiment and modifications at least any of the functional elements of the ink jet recording device 10 may be implemented by execution of a program. In such a case the program is pre-stored and provided in a ROM, for example. Alternatively, the program to be executed by the ink jet recording device 10 may be recorded and provided in an installable or executable file format on a computer-readable recording medium such as a compact disc read only memory (CD-ROM), a flexible disk (FD), a compact disk-recordable (CD-R), or a digital versatile disc (DVD). Alternatively, in the above embodiment and modifications the program to be executed by the ink jet recording device 10 may be stored on a computer connected to a network, such as the Internet, and provided by being downloaded via the network. Alternatively, the program to be executed by the ink jet recording device 10 may be provided or distributed via a network such as the Internet. In the above embodiment and modifications, the program to be executed by the ink jet recording device 10 includes a module configuration including at least any of the above functional elements. As actual hardware, the CPU reads programs from the storage device, and executes the programs to load the functional elements onto the main storage device.

According to one embodiment, image unevenness caused by a serial-scanning, connected longer-length head can be remedied.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharging device that discharges a liquid onto a recording medium for image formation, the device comprising:
   a plurality of head modules each comprising an array of nozzles that discharge a liquid of at least one color, the head modules being connected in a direction of the nozzle array from one of the head modules, the one supported by a guide extending in a main-scanning direction; and
   processing circuitry that functions as:
      an acquirer configured to acquire image data based on which the image is formed; and an allocator configured to allocate, to dots of the image data, a row of droplets of the liquid discharged from one of the head modules closest to the guide in a sub-scanning direction, such that the liquid droplets discharged from the head module closest to the guide are in ratio than the liquid droplets discharged from each of the head modules other than the head module closest to the guide, wherein the allocator allocates the liquid droplets to the dots of image data such that the liquid droplets discharged from the head module closest to the guide are higher in ratio than the liquid droplets discharged from each of the head modules other than the head module closest to the guide.

2. The liquid discharging device according to claim 1, wherein
the allocator allocates, to the dots of image data, the row of liquid droplets discharged from each of the head modules in the sub-scanning direction.

3. The liquid discharging device according to claim 1, wherein
the allocator allocates the liquid droplets to the dots of image data such that the liquid droplets discharged from at least two of the head modules other than the head module closest to the guide form the same dot row in the sub-scanning direction.

4. The liquid discharging device according to claim 1, wherein
the allocator allocates the liquid droplets to the dots of image data such that the liquid droplets discharged from the head module closest to the guide are overlaid on the liquid droplets discharged from at least one of the head modules other than the head module closest to the guide.

5. The liquid discharging device according to claim 1, wherein
the allocator allocates the liquid droplets to the dots of image data such that rows of liquid droplets discharged from the head module closest to the guide in the sub-scanning direction differ in color.

6. The liquid discharging device according to claim 1, wherein
the allocator allocates, to the dots of image data, at least a row of cyan liquid droplets and a row of magenta liquid droplets in the sub-scanning direction among the liquid discharged from the head module closest to the guide.

7. A liquid discharging method to be executed by a liquid discharging device that discharges a liquid onto a recording medium for image formation and comprises a plurality of head modules each including an array of nozzles that discharge a liquid of at least one color, the head modules being connected in a direction of the nozzle array from one of the head modules, the one supported by a guide extending in a main-scanning direction, the method comprising:
acquiring image data based on which the image is formed; and
allocating, to dots of the image data, a row of droplets of the liquid discharged from one of the head modules closest to the guide in a sub-scanning direction, such that the liquid droplets discharged from the head module closest to the guide are higher in ratio than the liquid droplets discharged from each of the head modules other than the head module closest to the guide, wherein the allocator allocates the liquid droplets to the dots of image data such that the liquid droplets discharged from the head module closest to the guide are higher in ratio than the liquid droplets discharged from each of the head modules other than the head module closest to the guide.

8. A computer program product comprising a non-transitory computer readable medium including programmed instructions, wherein the instructions, when are executed by a computer, mounted on a liquid discharging device that discharges a liquid onto a recording medium for image formation and comprises a plurality of head modules each including an array of nozzles that discharge a liquid of at least one color, the head modules being connected in a direction of the nozzle array from one of the head modules, cause the computer to execute:
acquiring image data based on which the image is formed; and
allocating, to dots of the image data, a row of droplets of the liquid discharged from one of the head modules closest to the guide in a sub-scanning direction, such that the liquid droplets discharged from the head module closest to the guide are higher in ratio than the liquid droplets discharged from each of the head modules other than the head module closest to the guide, wherein the allocator allocates the liquid droplets to the dots of image data such that the liquid droplets discharged from the head module closest to the guide are higher in ratio than the liquid droplets discharged from each of the head modules other than the head module closest to the guide.

9. The liquid discharging device according to claim 1, wherein the plurality of head modules are arranged in a staggered manner such that the neighboring nozzles in adjacent head modules are arranged at a same nozzle pitch.

* * * * *